INVENTOR
RICHARD BABINGTON WINN

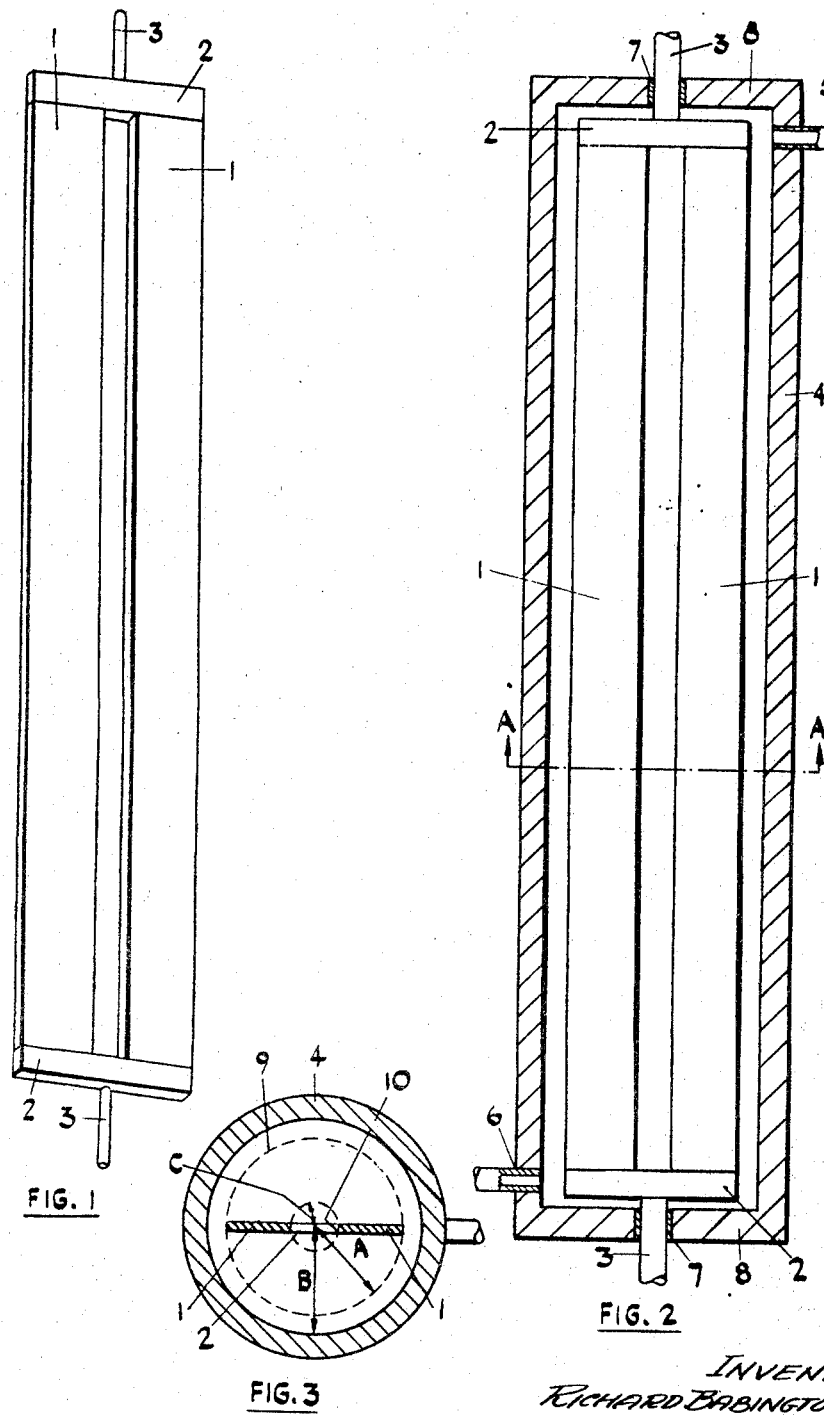

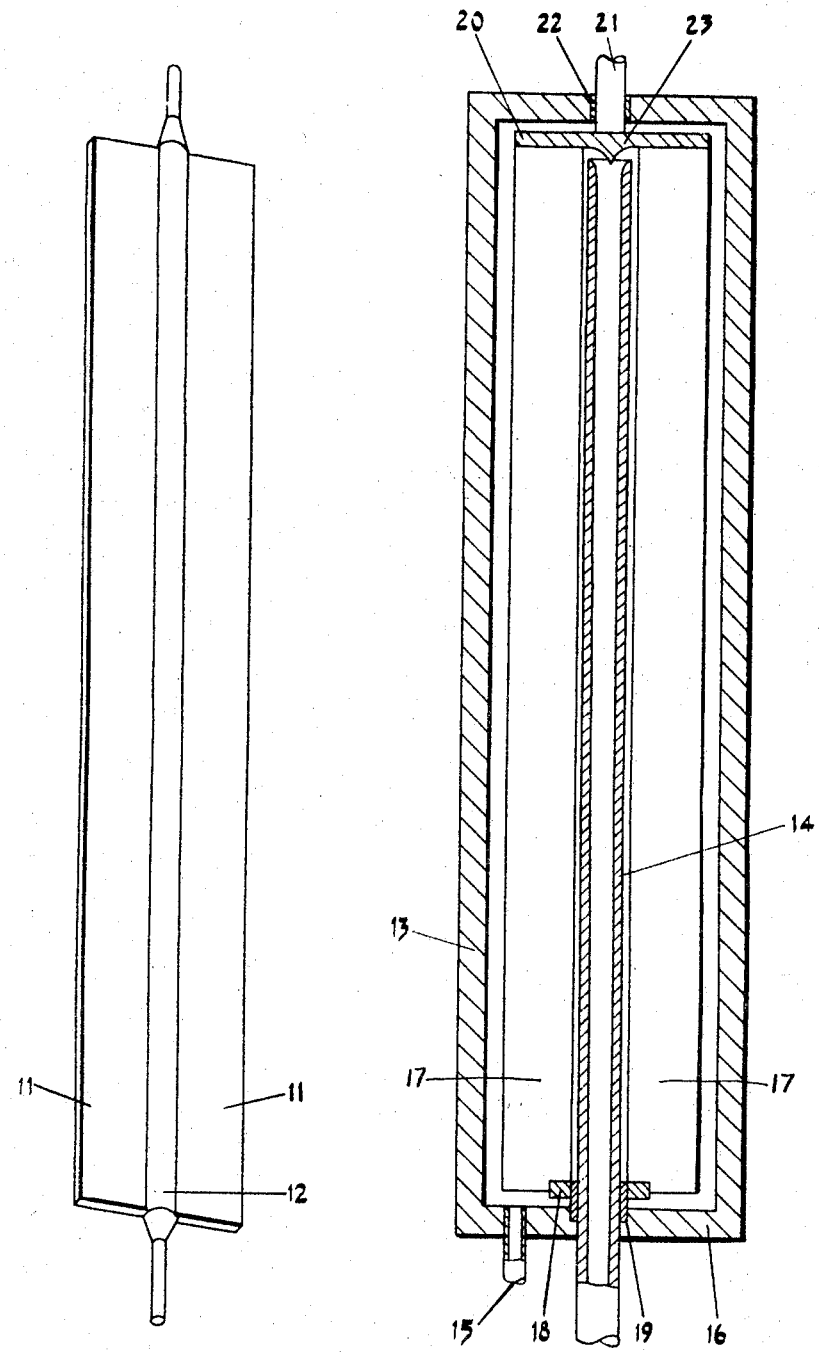

March 25, 1969  R. B. WINN  3,434,804
APPARATUS UTILIZING A WEBBED STIRRER FOR CONTINUOUS MIXING
Filed Aug. 6, 1965
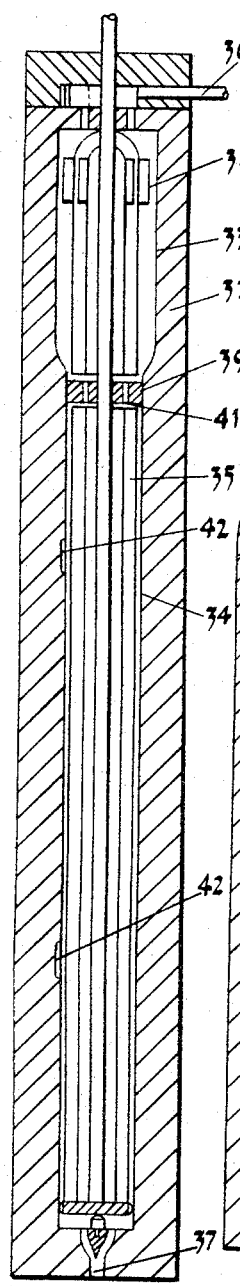
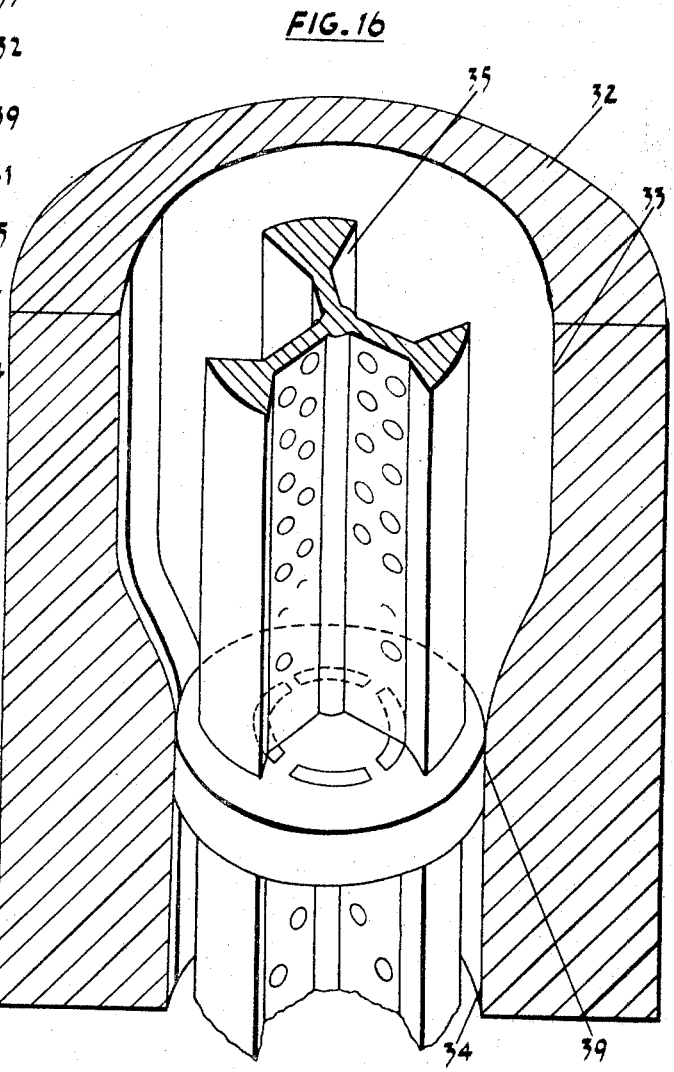
INVENTOR
RICHARD BABINGTON WINN

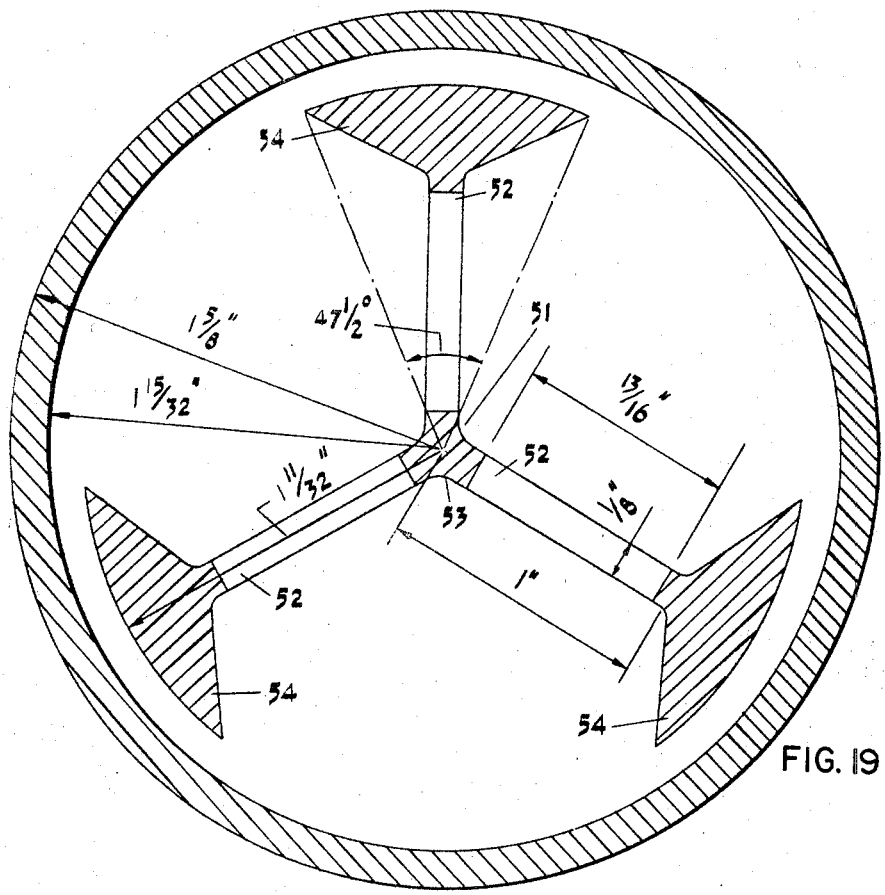
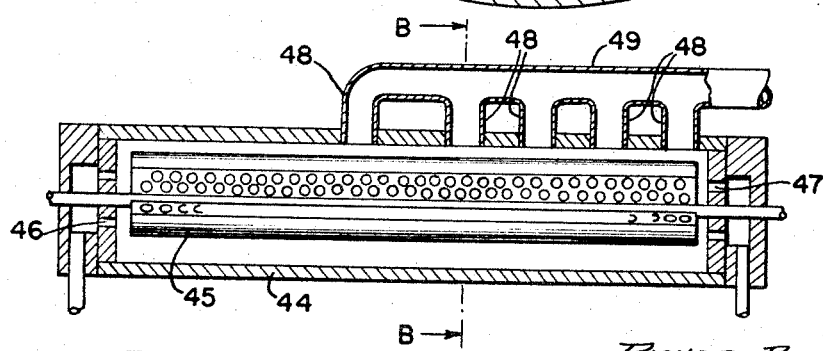
FIG. 19
FIG. 17
INVENTOR
RICHARD BABINGTON WINN 3,434,804
APPARATUS UTILIZING A WEBBED STIRRER FOR CONTINUOUS MIXING
Richard Babington Winn, Knebworth, England, assignor to Imperial Chemical Industries Limited, London, England, a corporation of Great Britain
Filed Aug. 6, 1965, Ser. No. 477,916
Claims priority, application Great Britain, Aug. 6, 1964, 32,017/64
Int. Cl. B01f 11/00, 13/00
U.S. Cl. 23—285                20 Claims

ABSTRACT OF THE DISCLOSURE

Apparatus for conducting continuous processes including a special type of webbed stirrer which minimizes end-to-end mixing.

---

Figure 6:
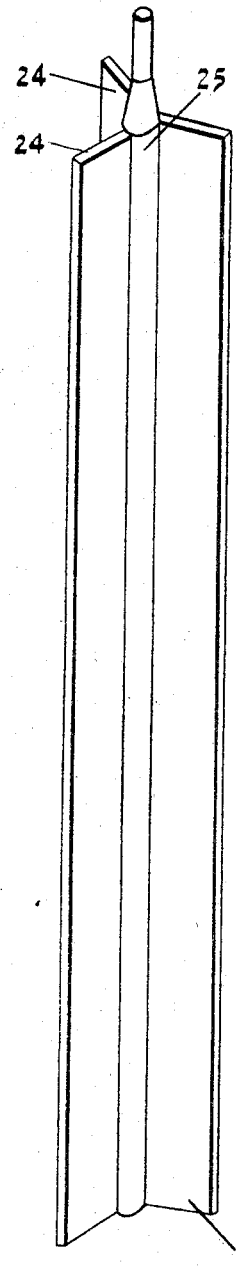

This invention relates to apparatus for conducting processes, and in particular to apparatus for conducting continuous chemical and physical processes in a stirred vessel.

When it is desired to conduct a process in a stirred medium in a vessel in a continuous manner, the medium undergoing the process is continuously admitted at one end of the vessel and the product or products continuously removed from the other end of the vessel.

In a non-continuous or batch process the medium is charged to the vessel and then the process is carried out. At the end of the process the products are removed and the vessel recharged. One advantage of a batch process is that all the contents of the medium in the vessel are subjected to the process for the same length of time. This often is both desirable and of importance in respect of the properties of the products of the process. For example, if the process is the polymerisation of unsaturated monomeric components, the degree of polymerisation of the monomeric components and hence the molecular weight of the resulting polymer depends, inter alia, on the length of the reaction. If the individual particles of the medium undergo the reaction for different periods, the resulting polymer will contain molecules having a wide range of molecular weights. It is often desirable to keep this range of molecular weights small and hence a batch process is desirable. However on the other hand a continuous process is nearly always to be desired for economic considerations.

In a continuous process, the action of the stirrer normally causes a certain amount of mixing of the medium at one end of the vessel with the medium at the other end of the vessel. This is often termed end-to-end mixing. This is due to the formation of eddy currents and also due to the "propeller" action of the stirrer. Thus medium just entering the vessel is mixed with the medium just about to leave the vessel. The time taken for a particle from entering the vessel to leaving it is often termed as the "residence" time. In this case, therefore, the various portions of the medium will undergo different reaction times and so there will be a spread of residence times. It is desirable therefore to provide apparatus for operating a continuous process in which end-to-end mixing is substantially reduced, or eliminated, thereby reducing the spread of residence times.

One method of performing this is to conduct the process in a screw extruder. This however suffers from the disadvantage that the actual mixing of particles of the medium with particles immediately adjacent is relatively small. Also if it is desired to have a relatively long residence time, then either the screw speed must be reduced thereby decreasing the mixing of material that entered the extruder at the same time or by having very finely pitched and/or long screws which increases the engineering complexity of the extruder.

Another method of achieving the object that has been proposed is to use a solid cylindrical stirrer that is free from baffles rotating inside a cylindrical vessel, the clearance between the walls of the vessel and the stirrer being relatively small. In this way the medium inside the vessel can be considered to be in the form of a thin-walled tube and is agitated by means of the eddy currents set up between the stirrer surface and the vessel walls. This system has the disadvantages that the vessel can only contain a small volume of medium at any time and hence the output is low or the vessel has to be very large. Another disadvantage is that, if the stirrer is a solid cylinder, it is relatively heavy for any given surface area and hence engineering difficulties are encountered. If the stirrer is lightened by making it hollow and the system used at elevated pressures, there is a danger that the medium at high pressure will diffuse through the material forming the stirrer or through any flaws therein into the cavity and hence if inflammable materials are present in the medium an explosion risk is created.

Therefore according to the present invention we provide apparatus for conducting continuous processes in which a medium is continuously stirred, comprising a hollow vessel at least part of which has a cylindrical interior surface and a length substantially greater than its diameter and is free from baffles at least over a major proportion of its length, and means for introducing the medium into one end of the vessel, and means for removing the medium from the other end of the vessel, and a stirrer, mounted in said part of the vessel, which is rotatable about an axis substantially parallel to the longitudinal axis of said cylindrical interior surface, said stirrer comprising one or more section each comprising at least two interconnected radially disposed webs, extending parallel to the axis of the stirrer, the length of the webs being at least a major proportion of the length of the stirrer section, the total length of the stirrer being a major proportion of the length of said cylindrical surface and the width of the webs being such that when the stirrer is rotated, the outside diameter of the annulus generated by rotation of the webs about the stirrer axis is at least 60% of the interior diameter of said cylindrical interior surface, and the thickness of said annulus is at least 50% of the interior radius of said cylindrical interior surface. We also provide a process for continuously stirring a medium undergoing a continuous process comprising continuously feeding this medium through an inlet port into one end of a hollow vessel at least part of which has a cylindrical interior surface and a length substantially greater than its diameter, said part having the cylindrical interior surface being free from baffles over a major proportion of its length continuously agitating the medium within said part by rotating a stirrer about an axis substantially parallel to the longitudinal axis of said cylindrical interior surface, said stirrer comprising one or more sections, each section comprising at least two interconnected radially disposed webs extending parallel to the axis of the stirrer, the length of the webs being at least a major proportion of the length of the stirrer section; the total length of the stirrer being a major proportion of the length of said cylindrical surface, and the width of the webs being such that when the stirrer is rotating an annulus is generated by rotation of the webs about the stirrer axis, the outside diameter of the annulus is at least 60% of the interior diameter of said cylindrical interior surface and the thickness of the annulus is at least 50% of the interior radius of said cylindrical interior surface, and thereafter continuously removing the medium from the other end of said vessel.

The simplest form of the stirrer comprises two or more plate-like webs connected together at one or both ends and provided with means for rotating the webs about an axis substantially parallel to the length of the webs. The webs are preferably evenly disposed about the axis of rotation of the stirrer.

This form of stirrer is illustrated in FIGURE 1 which is a perspective view showing a stirrer having two webs, one connected at each by a bar 2 attached to axles 3.

FIGURE 2 is a longitudinal section of a stirrer of the type shown in FIGURE 1 fitted inside a vessel, and FIGURE 3 is a cross section along the line A—A of FIGURE 2.

The vessel 4 has a hollow interior surface and is fitted with inlet and outlet ports 5 and 6. The means for driving the stirrer are not shown.

When the stirrer is rotated on axles 3 which are journalled in bearings 7 in the end walls of the vessel an annulus 9 is generated. This is shown in broken lines in FIGURE 3.

This annulus has an outside diameter (2×distance A) of at least 60% of the diameter of the interior cylindrical surface of the vessel (2×distance B). If the outside diameter of the annulus is less than 60% of the diameter of the cylindrical interior surface of the vessel, then the degree of "end-to-end" mixing becomes appreciable. For the same reason, and to ensure good mixing it is also necessary that the thickness of the annulus (distance C) is at least 50% of the radius of the cylindrical surface interior of the vessel. The thickness of the annulus is determined by the width of the webs and also the distance of each of the webs from the axis of rotation of the stirrer. For example, one web may be disposed closer to the axis of the stirrer than other web or webs and also the webs may be of different widths.

However, it is preferred that the webs are all of the same size and are equally spaced from the axis of the stirrer and are disposed at equal intervals round the axis of the stirrer since a symmetrical stirrer presents far fewer engineering problems, for example vibration, than an asymmetric stirrer.

To obtain the minimum of "end-to-end" mixing we prefer that the outside diameter of the annulus is at least 75%, in particular, between 85 and 98% of the diameter of the cylindrical interior surface.

We also prefer that the thickness of the annulus is at least 60%, and in particular at least 75%, of the radius of the cylindrical interior surface.

The space between the inner edges 10 of the webs is preferably filled by a core to avoid unstirred portions of the medium.

A simple stirrer of this structure is shown in perspective in FIGURE 4. Here the stirrer webs 11 are formed integrally with a core 12 which preferably has a circular cross section. The core need not, however, be formed integrally with the webs and, indeed, need not be attached to the stirrer. In some systems the core conveniently is a stator or may rotate in the opposite direction to the stirrer. The core may be hollow in some cases to permit the passage of a heating or cooling fluid, or for the introduction or removal of the medium where it is not desired to have a port at each end of the vessel. FIGURE 5 which is a longitudinal section of a stirrer mounted in a vessel illustrates this.

In FIGURE 5 the vessel 13 is fitted with a central hollow stator 14 through which the medium can enter the vessel.

An outlet port 15 is fitted in the end wall 16 of the vessel so that the medium can be introduced and removed from the same end of the vessel. The stirrer has two webs 17 connected at one end by a ring 18 journalled on a bearing 19 and at the other end by a disc 20 attached to an axle 21 journalled in bearing 22. Disc 20 is provided with a central concave conical projection 23 which serves to cause the medium issuing from the hollow stator 14 to be directed radially into the vessel.

If a core is present we prefer that it has a circular cross section and has a diameter of less than 10%, preferably less than 5% of the diameter of the cylindrical interior surface.

While the stirrers shown hereinbefore have only two webs, it will be appreciated that there may be more than two webs. In particular we have found systems with three or four evenly disposed webs give good results. In particular, stirrers having three webs attached to a solid core have a good strength/weight ratio. Such a stirrer is shown in a perspective view in FIGURE 6.

In this figure the stirrer has three webs 24 evenly disposed about a central core 25 which also acts as the axle used to support the stirrer.

In the stirrers shown hereinbefore, the stirrers have webs in the form of flat plates. While such stirrers are simple to construct, better reduction in "end-to-end" mixing may be obtained if the outer edge of the webs are increased in thickness by, for example, the formation of flanges thereon.

Figure 7:
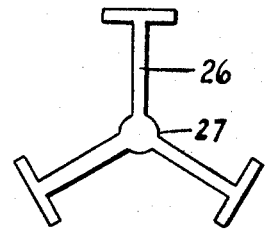
Figure 8:
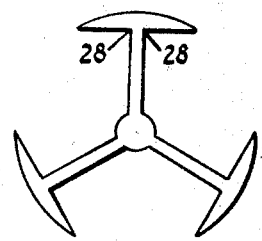
Figure 9:
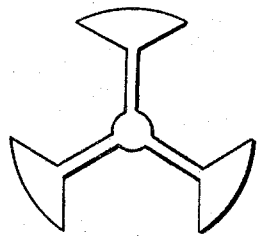

A simple form of flanged stirrer is shown in cross section in FIGURE 7 wherein three webs 26 which are shown attached to a core 27 have perpendicular plate-like flanges 28 formed on their outer ends. These flanges may be flat or curved, for example, shaped to the curvature of the circumference of the annulus generated by rotation of the webs about the axis of the stirrer. This is shown in FIGURE 8 which is a cross section of such a stirrer. However, when using a flanged stirrer "dead spots" or unstirred regions tend to be set up in the corners 28. Therefore it is preferred that the under edges of the flanges are inclined as shown in FIGURE 9. This system is particularly preferred since it can readily be constructed, gives good stirring and low end-to-end mixing.

Figure 10:
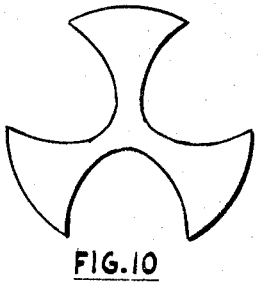

A stirrer of the type shown in cross section in FIGURE 10 wherein the sides of the webs are continuously curved to form flanges may provide better stirring with smaller dead spots than with the stirrer shown in FIGURE 9 but is not so readily constructed.

Figure 11:
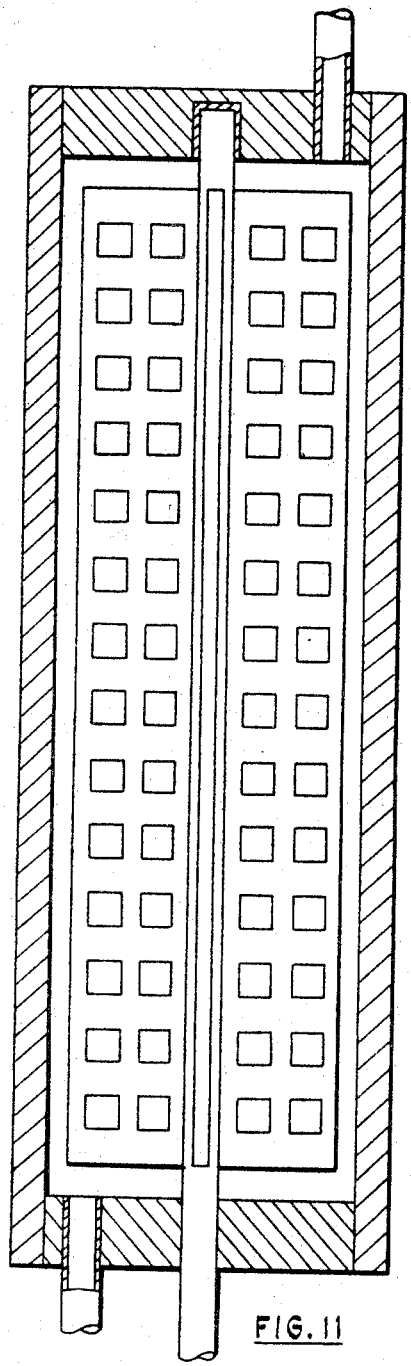
Figure 12:
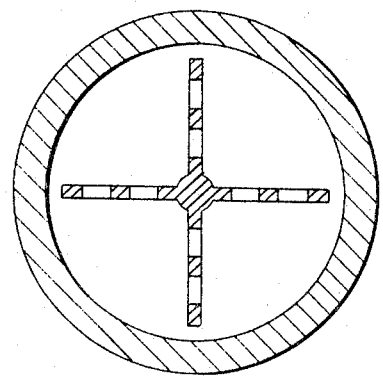

The webs are preferably perforated as this improves the degree of mixing of adjacent portions of the medium and also lightens the stirrer. A simple perforated stirrer is shown mounted in a vessel in longitudinal section in FIGURE 11, and in cross section in FIGURE 12.

Figure 13:
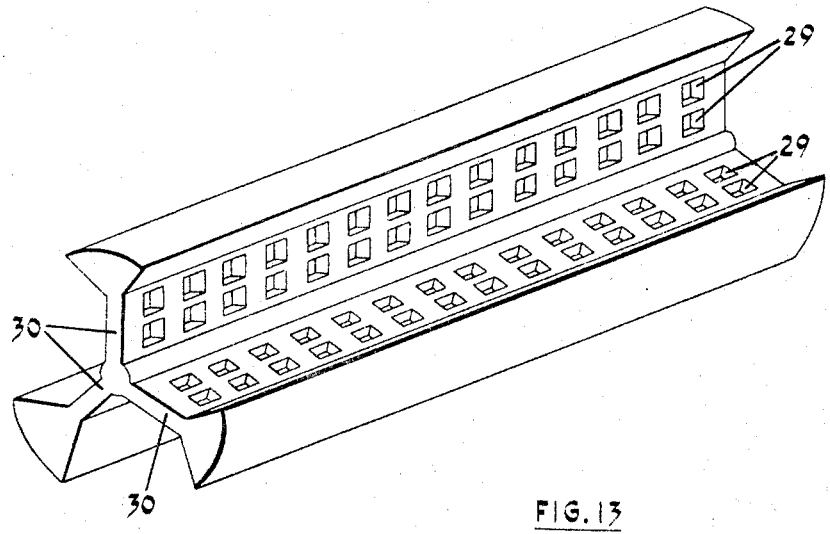

A preferred stirrer is shown in perspective in FIGURE 13. This stirrer is similar to that shown in cross section in FIGURE 9 but is perforated by means of a series of holes 29 in each web 30. The holes in the webs are shown in FIGURE 13 as rectangular but good results are also obtained with circular holes which are more readily made.

It will be appreciated that the region in which the type of stirring with which this invention is concerned need not constitute the whole of the volume of the vessel. For example, a long vessel may comprise several regions separated by baffles or other suitable devices, wherein in some regions conventional stirring takes place, i.e., with appreciable end-to-end mixing and other regions wherein stirring by the apparatus of this invention takes place. Likewise, it will be appreciated that the stirrer may be in several portions which may be driven independently at the same or different speeds. Also different sections of the stirrer may have different configuration, for example, differently shaped webs.

However each of the webs of each section of the stirrer should have a length substantially greater than the diameter of the cylindrical interior surface of the part of the vessel in which the stirrer section is located, and preferably has a length at least 3 times, in particular at least 8 times, and most preferably at least 12 times the diameter of said cylindrical interior surface. In general, we have found that the greater the length to diameter ratio, the less the "end-to-end" mixing.

By the term "free from baffles" we mean that the region of the vessel in which the "low end-to-end mixing"

type of stirring is desired, is free from protuberances extending from the cylindrical interior surface, towards the axis of the cylindrical part, and which extend into the annulus generated by the rotation of the stirrer. However, there may be small protuberances which do not extend into this annulus and preferably do not direct the flow of the medium being stirred. Such protuberances may be used for siting thermocouples or for injection of components into the medium. In order to minimise the "end-to-end" mixing we prefer that no part of the stirrer, upon rotation of the stirrer, imparts to the medium a force in the direction of the longitudinal axis of the vessel or stirrer. This may be achieved by minimising any areas of the stirrer surface which are located in planes inclined to the longitudinal axis of the stirrer at angles other than 90°. In particular we prefer that the stirrer should be constructed so that it is substantially free from such areas.

Figure 14:
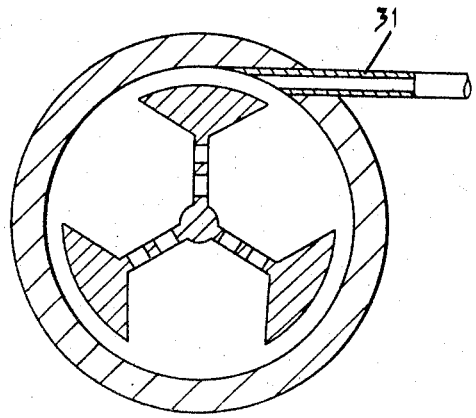

The stirrer should be rotatable about an axis substantially parallel to the longitudinal axis of the cylindrical interior surface. Preferably the stirrer is rotatable about an axis that is concentric with the axis of the cylindrical interior surface. However, when a long stirrer is used it may be in the form of a series of interconnected portions, the centre portions of which, when stationary, lie in contact with the cylindrical surface. We have found that when this type of stirrer is rotated the medium causes the stirrer to assume a position in which the stirrer portions are in line rotating about the longitudinal axis of the cylindrical interior surface. Thus, when using long stirrers there is no need for bearings in the centre of the vessel which might interrupt the flow of the medium. Preferably, the inlet and outlet ports of the vessel are arranged so that the flow pattern of the medium is undisturbed as far as possible. Thus it is preferred to arrange wherever possible that the medium is introduced or removed radially or tangentially. One method of radial introduction has been described hereinbefore in the system shown in FIGURE 5. A tangential method of introduction is shown in the system shown in cross section in FIGURE 14 wherein a stirrer of the type shown in FIGURE 13 is mounted in vessel in which a port enters the interior of the vessel tangentially.

As has been described hereinbefore, part of the vessel may be used for stirring in a region where "end-to-end" mixing is desired. This may, in some cases, be desirable for the initial mixing of ingredients being processed. In such systems the stirrer may extend out of the area in which low end-to-end mixing is desired into the other region. Here the vessel may still have a cylindrical interior surface but may be of a greater diameter. Such an arrangement is shown in FIGURE 15 which is a longitudinal section of such a system. In this system a vessel 32 is shown having two zones 33, 34, each having a cylindrical interior surface but zone 33 having an interior surface of a greater diameter than that of zone 34. A stirrer 35 of the type shown in FIGURE 13 is mounted in the vessel 32. The perforations of the stirrer are not shown in FIGURE 15. Inlet and outlet ports 36, 37 are provided at each end of the vessel. In the inlet zone 33, there is a relatively large clearance between the interior walls of the vessel, and the flanges of the stirrer, so that the annulus generated by the rotation of the webs does not have an outside diameter greater than 60% of the diameter of the cylindrical interior surface. Paddles 38 are fixed to the flanges of the stirrer to ensure good mixing of the medium including end-to-end mixing in this inlet zone 33. Zone 33 is separated from zone 34 by a baffle 39 which is shown in more detail in FIGURE 16.

The baffle 39 consists of a disc 40 through which the central core of the stirrer 35 passes. The disc is provided with part annular slots 41 so that the medium can transfer from zone 33 to zone 34.

Zone 34 has a cylindrical interior surface of a smaller diameter than that of zone 33 so that in zone 34, upon the rotation of the stirrer 35, the annulus generated has an outer diameter of at least 60% of the diameter of the cylindrical interior surface. Thus in zone 34, the medium is well agitated, yet end-to-end mixing is at a minimum. Recesses 42 are provided in the wall of the vessel to accommodate thermocouples.

The speed at which the stirrer is rotated will of course depend on (a) the nature of the process being performed;
(b) the nature, in particular the viscosity, of the medium undergoing the process;
(c) the amount of shear to which the medium is to be subjected and
(d) the design and size of the stirrer.

In general however we prefer that the stirrer is rotated at such a speed that the medium undergoing the process is subjected to turbulent flow. Simple experimentation will enable the optimum speed for any particular process to be determined.

Figure 18:
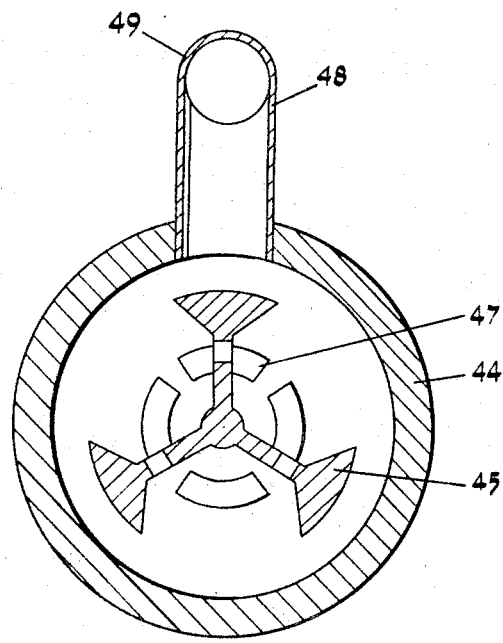

The apparatus of the present invention is particularly suited to carrying out chemical reactions and in particular processes for the polymerisation of ethylenically unsaturated monomers. Typical of these processes are the bulk processes for the polymerisation of, for example, ethylene and styrene; emulsion polymerisation processes as are used for polymerising vinyl chloride and the production of various synthetic rubbers; granular polymerisation processes as are used for polymerising vinyl chloride, methyl methacrylate and fluorocarbons such as tetrafluoroethylene; polymerisation processes involving solvents as are used for the production of high density polythene. It will be appreciated that in such processes it may be desirable to have not only ports at either end of the reaction vessel but also part-way along the reaction vessel, e.g. for adding catalyst in bulk polymerisation processes and for adding monomer and/or emulsifying agents to emulsion polymerisation processes, or for removing by-products of reaction, e.g. water vapour, as in polycondensation processes, for instance in the production of nylon or polyethylene terephthalate. A suitable apparatus for conducting processes in which products such as water vapour have to be removed is shown in FIGURE 17 and FIGURE 18 which is a section along the line B—B of FIGURE 17, in which a horizontally mounted vessel 44 is shown fitted with a stirrer 45 of the type shown in FIGURE 13. Inlet and outlet ports 46 and 47 are fitted at each end of the vessel and a series of vents 48 are formed in the upper wall of the vessel. These vents communicate with a header line 49 which is attached to a vacuum pump (not shown). Thus in operation volatile material can be extracted from the medium in the vessel through the vents 48.

It will also be appreciated that in processes involving the passage of granular materials, e.g. slurries of catalyst or suspensions of polymer granules, suitable valves, e.g. rotary valves, may be necessary at the inlet and outlet ports of the vessel.

In a system where there is a gas phase and a liquid phase, the stirrer exerts a "splashing" effect ensuring good gas/liquid contact. Surprisingly, "end-to-end" mixing in such a system is very small.

The invention is illustrated but in no way limited by reference to the following examples:

EXAMPLE I

In this example methyl methacrylate was continuously polymerised in a stirred reaction vessel according to the invention.

Description of apparatus.—The apparatus is shown in cross-section in FIGURE 19. The reaction vessel was in the form of a vertical hollow glass cylinder 50, 19 feet long, having an outside diameter of 3¼ inches and an internal diameter of 2¹⁵⁄₁₆ inches. This was surrounded by a water jacket (not shown) through which water could be continuously pumped to control the vessel temperature.

Ports (not shown) were situated at each end of the vessel to provide the inlet and outlet.

The stirrer 51 was made up from three equal sections which were mounted in line and had their axis of rotation coincident with the longitudinal axis of the vessel.

Each section has a form similar to the unit shown in FIGURE 13, i.e. it has three equal webs 52 extending radially from a core 53 and each web has a flange. Each web is perforated with a single line of holes of 13/16 inch diameter with their centres spaced 1 1/10 inches along the length of the web. The webs had a thickness of 1/8 inch. The overall diameter of the stirrer section 51 was 2 11/16 inches (corresponding to 91.5% of the inside diameter of the vessel).

The outer ends of the webs were provided with flanges 54. The width of the unflared portion of each web (i.e. the distance from the centre of the core to the start of the flange 54) was 1 inch. The shape of the flange 54 was such that an angle of 47.5° was subtended at the centre of the stirrer section. In this stirrer it is seen that the core 53 is in fact merely formed by the merging of the three webs 52.

The stirrer section at one end of the vessel was driven by an external motor while the section adjacent to this driven section was driven by the first section. Likewise, the third section was driven by the second section. The vessel has a nominal capacity of about 22 litres.

Polymerisation details.—An aqueous solution of the following proportions was made up:

| | Parts by weight |
|---|---|
| Water | 1200 |
| Sodium dodecyl benzene sulphonate | 5.24 |
| Potassium persulphate | 0.7 |

The vessel was filled with this solution and then more of the solution was added continuously at an average rate of 11 ml./sec. into the top of the vessel.

Methyl methacrylate was then added continuously at an average rate of 4 ml./sec. into the top of the vessel.

The stirrer was rotated at 660 r.p.m. and the temperature maintained at 65° C. The residence time of particles in the vessel was about 25 minutes, as indicated by injecting a small quantity of dye into the aqueous solution just as it entered the vessel and observing its progress down the vessel. It was observed that the dye travelled down the vessel in a "plug" showing that "end-to-end" mixing was not occurring.

The power consumed by the stirrer was about 390 watts.

A stable milky white emulsion of polymethyl methacrylate in water was formed and, upon analysis, was found to have a solids content of about 7.5% by weight, corresponding to a conversion of monomer to polymer of 28% by weight. No build up in the vessel or on the stirrer was observed. The solids content, and correspondingly the conversion, could be increased by using lower rates of monomer and aqueous phase addition and/or using a longer vessel.

EXAMPLE II

The apparatus used in Example I was used for continuous polymerisation of styrene by an aqueous emulsion polymerisation technique.

An aqueous solution of the following ingredients was made up:

| | Parts by weight |
|---|---|
| Water | 200 |
| Sodium dodecyl benzene sulphonate (emulsifier) | 3.0 |
| Potassium sulphate | 0.5 |
| Sodium hexametaphosphate | 0.05 |

The vessel was filled with this solution and heated to 80° C. and then more of the solution was preheated to 80° C. and added continuously at an average rate of 4.4 ml./sec. into the top of the vessel via a flowmeter. A mixture of 100 parts by weight of styrene and 0.1 part by weight of t-dodecyl mercaptan (modifier) was then added to the top of the vessel, via a flowmeter, at an average rate of 2.2 ml./sec.

An aqueous solution of 3 parts by weight of potassium persulphate (catalyst) dissolved in 100 parts by weight of water was also added to the top of the vessel from a burette. The temperature of the vessel and contents was controlled at 80° C. by varying the rate of addition of the catalyst solution. On average, however, the rate of addition was such that 0.1 part by weight of potassium persulphate were added for each 100 parts by weight of styrene.

The residence time was 60 minutes. Samples of the resulting latex of polystyrene were taken at intervals and tested. The details are shown in the table below.

| Time in hours from start of catalyst addition | Solids content of latex (percent by weight) | Conversion (percent by weight) | Comments |
|---|---|---|---|
| 0 | | | Start up. |
| 4 | 20.3 | 99 | How solids since equilibrium conditions not yet achieved. |
| 11½ | 28.8 | 98 | |
| 13 | 22.2 | 84 | |
| 17 | 25.5 | 92 | Amount of build up of polymer on the stirrer and vessel walls was small. |
| 18½ | 34.1 | 97 | |
| 21 | 32.0 | 99 | |
| 22 | 26.8 | 92 | |
| 23 | 29.4 | 98 | |
| 24 | 31.0 | 98 | |

The latex samples were examined by electron microscopy and it was found that the latices all had a normal particle size distribution in the range of 0.01 to 0.12 micron. No large particles, i.e., of the order of $5\mu$ or greater, as are sometimes observed in polystyrene latices were found in these samples. The mechanical stability of the latices was tested by rotating a small paddle stirrer in the latex at a speed of about 14,000 r.p.m. No break down of the latices, i.e., no coagulation occurred after 30 minutes stirring, indicating that the mechanical stability of the latices was very good.

EXAMPLE III

Example II was repeated but using an aqueous solution A of the following composition.

| | Parts by weight |
|---|---|
| Water | 100 |
| Sodium dodecyl benzene sulphonate (emulsifier) | 3.2 |
| Potassium sulphate | 0.7 |
| Sodium hexametaphosphate | 0.05 |
| Sodium hydroxide | 0.15 |

The polymerisation was carried out as in Example II but at a temperature of 75° C. in place of 80° C. Other modifications to the procedure of Example II were that the aqueous solution of the catalyst was added at such a rate that on average 0.15 part by weight of potassium persulphate were added for each 100 parts by weight of styrene. The rate of addition of the monomer, aqueous solution A and catalyst solution were reduced so that the residence time was 80 minutes. Additional water was also introduced into the top of the vessel in order to control the solids content at about 36–40% by weight.

In this example steady state conditions were attained rapidly and 100 minutes after start up the solids content was 36.3% by weight and the conversion 99.5% by weight. 3 hours 15 minutes after start up the solids content was 38.3% by weight and the conversion was 99.2% by weight. The polymerisation was stopped after 4 hours from start up. At no time was any build up observed and at all times the latices had a particle size distribution and stability similar to those of Example II.

I claim:

1. Apparatus for conducting continuous processes in which a medium is continuously stirred, comprising a hollow vessel at least part of which has a cylindrical interior surface and a length substantially greater than its diameter and is free from baffles at least over a major proportion of its length, and means for introducing the medium into one end of the vesssel, and means for removing the medium from the other end of the vessel, and a stirrer, mounted in said part of the vessel, which is rotatable about an axis substantially parallel to the longitudinal axis of said cylindrical interior surface, said stirrer comprising one or more sections, each section comprising at least two interconnected radially disposed webs, extending parallel to the axis of the stirrer, the length of the webs being at least a major proportion of the length of the stirrer section, the total length of the stirrer being a major proportion of the length of said cylindrical surface, and the width of the webs being such that when the stirrer is rotated, the outside diameter of the annulus generated by rotation of the webs about the stirrer axis is at least 60% of the interior diameter of said cylindrical interior surface, and the thickness of said annulus is at least 50% of the interior radius of said cylindrical interior surface, each of said webs being provided with a flange at its outer edge.

2. Apparatus as claimed in claim 1 in which the width of the webs is such that the outside diameter of the annulus generated by rotation of the webs about the stirrer axis is at least 75% of the interior diameter of the cylindrical interior surface.

3. Apparatus as claimed in claim 2 in which the width of the webs is such that the ouside diameter of the annulus generated by rotation of the webs about the stirrer axis is between 85 and 98% of the interior diameter of the cylindrical interior surface.

4. Apparatus as claimed in claim 1 in which the width of the webs is such that the thickness of the annulus generated by rotation of the webs about the stirrer axis is at least 60% of the radius of the cylindrical interior surface.

5. Apparatus as claimed in claim 2 in which the width of the webs is such that the thickness of the annulus generated by rotation of the webs about the stirrer axis is at least 75% of the radius of the cylindrical interior surface.

6. Apparatus as claimed in claim 1 in which a core is interposed between the inner edges of the webs.

7. Apparatus as claimed in claim 6 in which the core is attached to the webs.

8. Apparatus as claimed in claim 1 in which the core is circular in cross-section and has a diameter of less than 10% of the diameter of the cylindrical interior surface.

9. Apparatus as claimed in claim 8 in which the core has a diameter of less than 5% of the diameter of the cylindrical interior surface.

10. Apparatus as claimed in claim 1 in which the stirrer has three webs.

11. Apparatus as claimed in claim 1 in which the webs are perforated.

12. Apparatus as claimed in claim 1 in which the flanges have an outer surface curved to the curvature of the circumference of the annulus generated by rotation of the webs about the stirrer axis.

13. Apparatus as claimed in claim 12 in which each web has a length at least three times the diameter of the cylindrical interior surface of the part of the vessel in which the stirrer section carrying said web is located.

14. Apparatus as claimed in claim 13 in which each web has a length at least eight times the diameter of the cylindrical interior surface of the part of the vessel in which the stirrer section carrying said web is located.

15. Apparatus as claimed in claim 14 in which each web has a length at least twelve times the diameter of the cylindrical interior surface of the part of the vessel in which the stirrer section carrying said web is located.

16. Apparatus as claimed in claim 1 in which the stirrer comprises a plurality of interconnected sections.

17. Apparatus as claimed in claim 1 in which the stirrer is constructed so that it is substantially free from areas located in planes inclined to the longitudinal axis of the stirrer at angles other than 90°.

18. Apparatus as claimed in claim 1 in which the means for introducing the medium into the vessel is arranged to introduce the medium into the vessel in a direction perpendicular to the stirrer axis.

19. Apparatus as claimed in claim 1 in which the means for removing the medium from the vessel is arranged to remove the medium from the vessel in a direction perpendicular to the stirrer axis.

20. Apparatus for conducting continuous processes in which a medium is continuously stirred comprising a hollow vessel at least part of which has a cylindrical interior surface and a length substantially greater than its diameter and is free from baffles over a major part of its length, and means for introducing the medium into one end of the vessel, and means for removing the medium from the other end of the vessel, and a stirrer mounted in said part, said stirrer being rotatable about an axis substantially parallel to the longitudinal axis of said cylindrical interior surface, said stirrer comprising one or more sections, each stirrer section comprising a core and attached thereto at least two radially disposed webs extending parallel to the axis of the stirrer, the length of the webs being at least a major proportion of the length of the stirrer section, said webs having perforations therein, the width of said webs being such that when the stirrer is rotated, the outside diameter of the annulus generated by rotation of the webs about the stirrer axis is at least 60% of the interior diameter of said cylindrical interior surface and said core having a cylindrical cross-section of diameter less than 10% of the diameter of said cylindrical interior surface, each of said webs being provided with a flange at its outer edge.

References Cited

UNITED STATES PATENTS

| | | | |
|---|---|---|---|
| 2,301,204 | 11/1942 | Fields et al. | 260—95 XR |
| 2,517,339 | 8/1950 | Offutt et al. | 23—288.3 |
| 2,769,804 | 11/1956 | Hanson | 260—86.7 |
| 2,976,131 | 3/1961 | Milne | 23—285 |
| 3,030,193 | 4/1962 | Marullo et al. | 23—290 |
| 3,215,506 | 11/1965 | Keil et al. | 23—285 |
| 3,296,168 | 1/1967 | Jirik et al. | 260—29.6 |
| 3,003,986 | 10/1961 | Long | 260—29.6 |
| 2,445,741 | 7/1948 | Franz et al. | 259—6 XR |

MORRIS O. WOLK, *Primary Examiner.*

M. D. BURNS, *Assistant Examiner.*

U.S. Cl. X.R.

23—284